United States Patent
Bovyrin et al.

(10) Patent No.: US 10,872,244 B2
(45) Date of Patent: Dec. 22, 2020

(54) ROAD MARKING EXTRACTION FROM IN-VEHICLE VIDEO

(71) Applicant: Intel Corporation, Santa Clara, CA (US)

(72) Inventors: Alexander Bovyrin, Nizhy Novgorod (RU); Nikita Manovich, Nizhy Novgorod (RU)

(73) Assignee: Intel Corporation, Santa Clara, CA (US)

( * ) Notice: Subject to any disclaimer, the term of this patent is extended or adjusted under 35 U.S.C. 154(b) by 499 days.

(21) Appl. No.: 15/248,823

(22) Filed: Aug. 26, 2016

(65) Prior Publication Data

US 2017/0061220 A1 Mar. 2, 2017

Related U.S. Application Data

(60) Provisional application No. 62/211,920, filed on Aug. 31, 2015.

(51) Int. Cl.
*H04N 7/18* (2006.01)
*G06K 9/00* (2006.01)
*B60W 30/12* (2020.01)

(52) U.S. Cl.
CPC ......... *G06K 9/00798* (2013.01); *B60W 30/12* (2013.01); *B60K 2370/146* (2019.05); *B60K 2370/152* (2019.05); *B60W 2420/42* (2013.01)

(58) Field of Classification Search
CPC ........... G06K 9/00798; G06K 9/00805; G06K 9/00791; G06K 9/4652; G06K 9/4647; G06K 2009/4666; G06K 9/00476; G06K 9/46; G06K 9/52; G06K 9/6215; G06K 9/6267

USPC ......................................................... 348/148
See application file for complete search history.

(56) References Cited

U.S. PATENT DOCUMENTS

2004/0201672 A1* 10/2004 Varadarajan ........... H04N 7/183
348/148
2008/0136673 A1* 6/2008 Jung ................... B62D 15/0285
340/932.2

OTHER PUBLICATIONS

Thomas et al. ("Evaluation of Road Marking Feature Extraction" published in Proceedings of the 11th International IEEE Conference on Intelligent Transportation Systems Beijing, China, on Oct. 12-15, 2008) (Year: 2008).*
Massimo et al. (Real-Time Lane and Obstacle Detection on the Gold System) (Year: 1996).*
Bertozzi, M., et al., "Real-time lane and obstacle detection on the Gold System," in Intelligent Vehicles Symposium, Proceedings of the IEEE, Sep. 19-20, 1986 (6 pages).
Veit, T., et al., "Evaluation of road marking Feature Extraction," in Proc. 11th Int. IEEE Conf. ITSC, Oct. 2008 (8 pages).
(Continued)

*Primary Examiner* — Masum Billah
(74) *Attorney, Agent, or Firm* — Trop, Pruner & Hu, P.C.

(57) ABSTRACT

A two-stage pipeline includes a first stage that is a static filter applied to an inverse perspective mapping (IPM) image. A SLAT (Symmetrical Local Adaptive Threshold) method, according to some embodiments, is more adaptive to environment changes. Additional geometry restrictions in the static filter remove clutter. The second stage of the pipeline is a dynamic filter. The motion of blobs is analyzed to find regions that look and behave like road marking.

24 Claims, 6 Drawing Sheets

(56) References Cited

OTHER PUBLICATIONS

Aly, M., "Real time detection of lane markers in urban streets," in Proc. IEEE Intell. Vehicles Symp., 2008 (6 pages).
Stefano, L.D., et al., "A simple and efficient connected components labeling algorithm", in Proceedings of International Conference on Image Analysis and Processing, 1999 (6 pages).

* cited by examiner

ROAD MARKING EXTRACTION FROM IN-VEHICLE VIDEO

CROSS-REFERENCE TO RELATED APPLICATIONS

This is a non-provisional application that claims priority to provisional application 62/211,920 filed Aug. 31, 2015.

BACKGROUND

This relates to computer recognition of lane markings while a car is in motion.

Road marking extraction is a crucial task in developing Lane Departure Warning (LDW) and Lane Keep Assist (LKA) systems. These systems are used to minimize accidents by addressing the main causes of collisions: driver error, distractions and drowsiness. Thus to be useful, LDW and LKA should work in real-time, often on low-power mobile or embedded devices.

Road marking extraction is one of the key blocks and usually the most process-intensive part of an Advanced Driver Assistance System (ADAS).

BRIEF DESCRIPTION OF THE DRAWINGS

Some embodiments are described with respect to the following figures.

DETAILED DESCRIPTION

Figure 1:
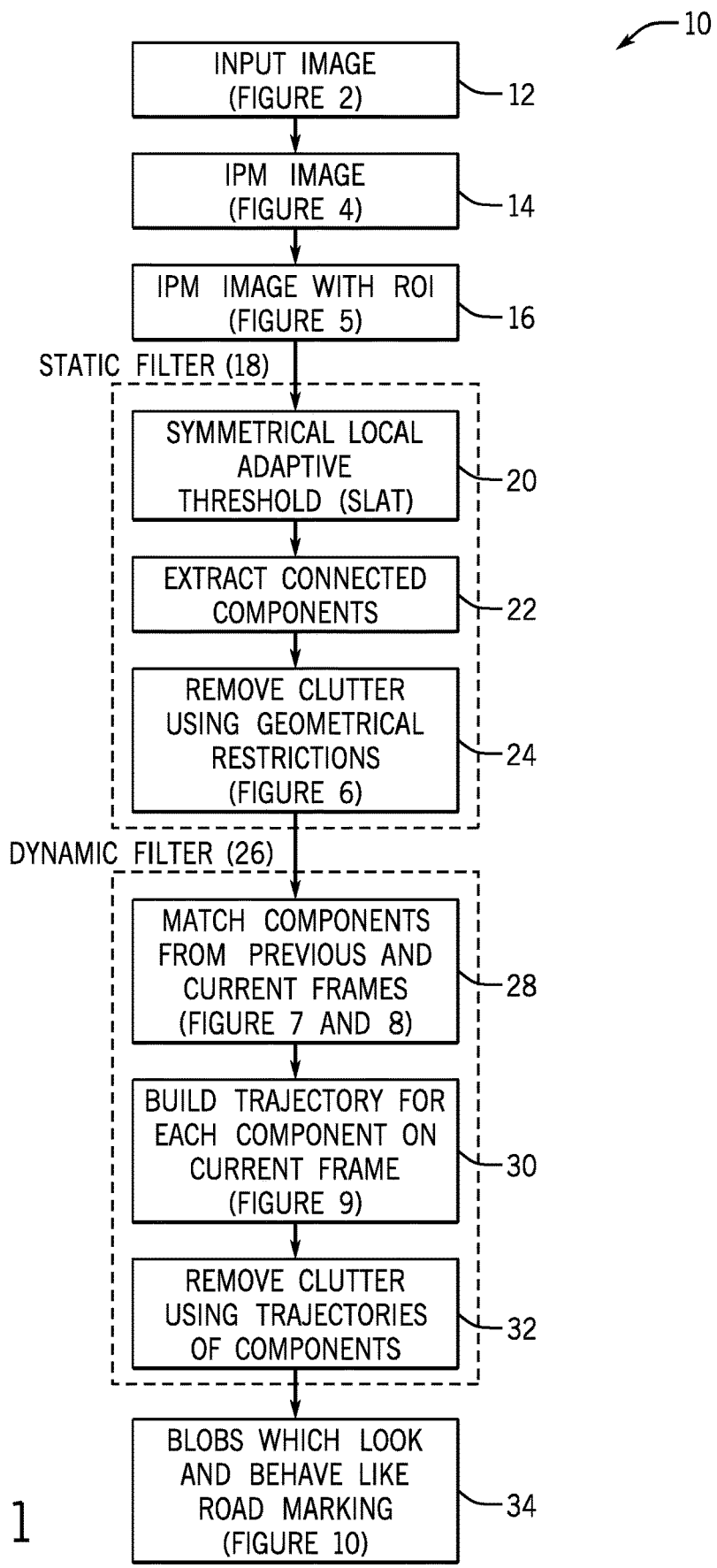
FIG. 1 schematically depicts the road marking extraction algorithm and begins with an input image according to one embodiment.

As shown in FIG. 1, a two-stage pipeline 10 includes a first stage 12 that is a static filter applied to an inverse perspective mapping (IPM) image 14. In IPM, an initial image is non-homogeneously resampled in order to produce a new image that represents the same scene as acquired from a different position. See Bertozzi, et al., "Stereo inverse perspective mapping: Theory and applications," Image and Vision Computing 16 (1998), pp. 585-590.

A Symmetrical Local Threshold (SLT) is a very efficient technique to extract regions with road marking. The main disadvantage of the approach is it is not adaptive to environment changes. A SLAT (Symmetrical Local Adaptive Threshold) method, according to some embodiments, is more adaptive to environment changes. Additional geometry restrictions in the static filter remove clutter.

The second stage of the pipeline is a dynamic filter 16. The dynamic filter analyze dynamic behavior or relative motion of road marking candidates while the static filter looks at appearance of candidate road markings. The motion of blobs 18 is analyzed to find regions that look and behave like road marking. A blob is an image region with distinct properties and these properties are constant enough that points in the blob may be treated as being similar to one another.

The sequence 10, shown in FIG. 1, may be implemented in software, firmware and/or hardware. In software and firmware embodiments, it may be implemented by computer executed instructions stored in one or more non-transitory computer readable media such as magnetic, optical or semiconductor storage.

After the input image 12 is mapped to an IPM image 14 and regions of interest 16 are defined, the static filter 18 processes the image to extract blobs that look like road marking. First of all, it applies a symmetrical local adaptive threshold filter 20 to find bright pixels on the road surface. Next it extracts them as a list of connected components to find regions that have an expected geometric form (block 22). "Connected Components" is a labelling used in computer vision to detect regions in binary digital images. Blob extraction may be performed using thresholding. Clutter is reduced using geometry restrictions (block 24).

Figure 3:
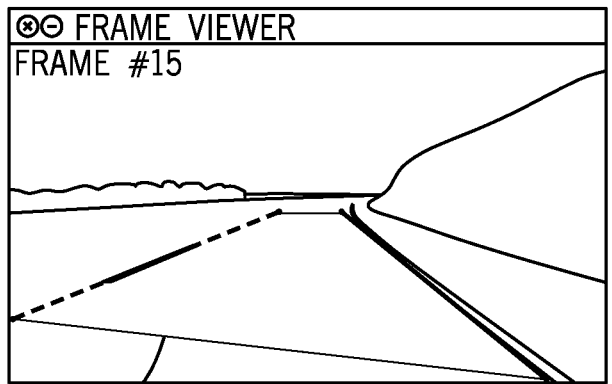
FIG. 3 shows the input frame with detected lane according to one embodiment.

Then the dynamic filter 26 analyzes motion of such blobs to keep only ones that behave like road marking. This may be done by matching connected components from previous and current input images, as shown in FIG. 1 at block 28. To reach the target it builds and analyzes trajectories for each component on the current frame (block 30) and excludes blobs that have unexpected, moving behavior (block 32). Blobs 34 that look and have like road marks are output from the dynamic filter. The end result is that a lane is detected as indicated by LANE in FIG. 3.

Figure 2:
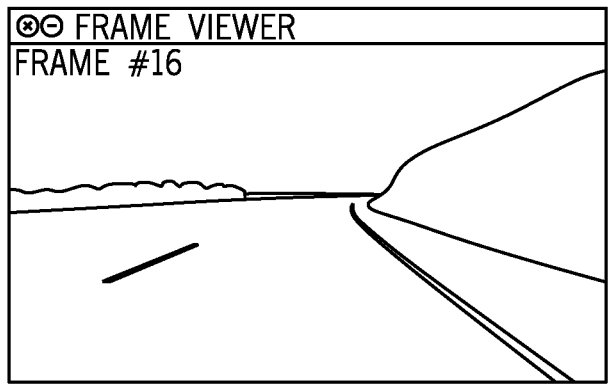
FIG. 2 shows an example of an input frame.
Figure 4:
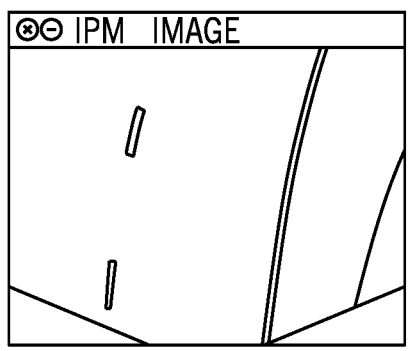
FIG. 4 is the Inverse perspective mapping (IPM) image according to one embodiment.

Input data includes providing an input image (FIG. 2) taken from a vehicular camera pointed in the direction of vehicle movement and applying inverse perspective mapping (IPM) (see FIG. 4) to a grayscale image (I). The 1 PM image is a bird's eye view image of the road including left and right regions of interest ($ROI_L$, $ROI_R$). $ROI_L$ and $ROI_R$ are built dynamically based on information from a previous frame. Usually the regions of interest are thin regions around detected left and right traffic lines from the previous frame (see FIG. 5). Output data comprises a list of left and right blobs that look and behave like road marking ($B_{L1}$, $B_{L2}$, ..., $B_{Ln}$, $B_{R1}$, $B_{R2}$, ..., $B_{Rp}$).

Figure 5:
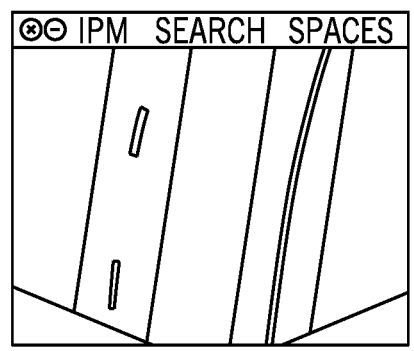
FIG. 5 shows the regions of interest according to one embodiment.
Figure 6:
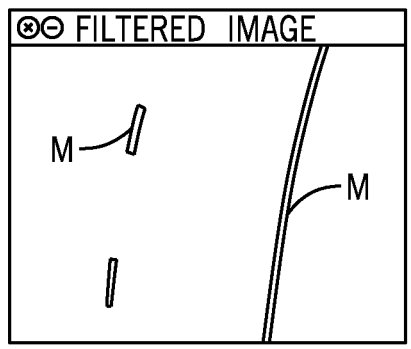
FIG. 6 is the filtered image according to one embodiment.

As the first step of the pipeline, the static filter extracts bright regions from the IPM input image (FIG. 4) with defined regions of interest (FIG. 5). It uses geometry restrictions to remove obvious clutter and returns promising pixels as a list of connected components (CLi, CRj) for left and right regions of interest): ($C_{L1}$, $C_{L2}$, ..., $C_{Lk}$, $C_{R1}$, $C_{R2}$, ..., $C_{Rm}$)=StaticFilter(I, $ROI_L$, $ROI_R$) correspondingly (FIG. 6).

Figure 7:
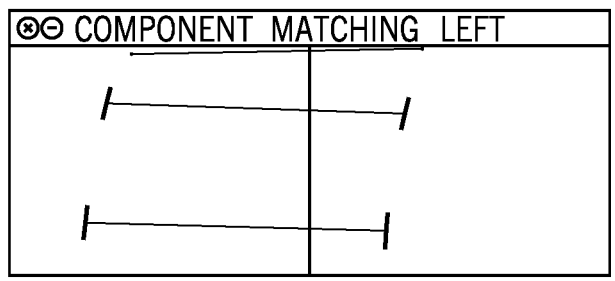
FIG. 7 shows the matching of the connected components of pixels on the left of the filtered image from a previous filtered image and a current filtered image according to one embodiment.
Figure 8:
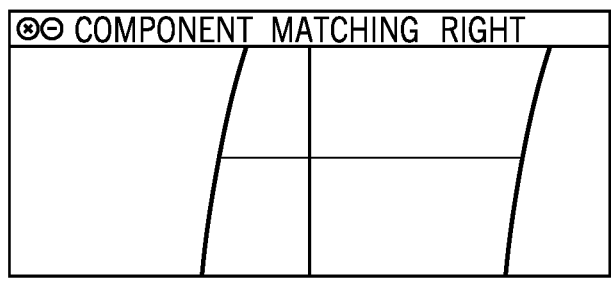
FIG. 8 shows the matching of the connected components of pixels on the right of the filtered image from a previous filtered image and a current filtered image according to one embodiment.
Figure 9:
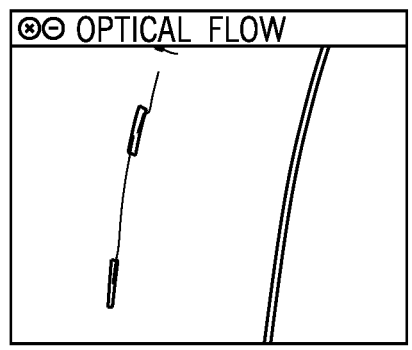
FIG. 9 shows the building of a trajectory for each component of the current filtered image according to one embodiment.
Figure 10:
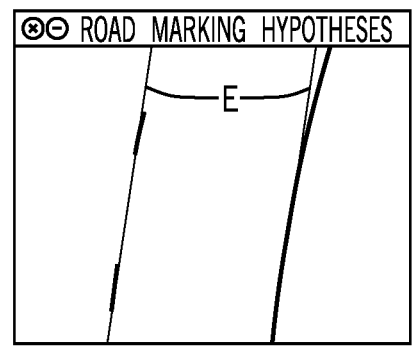
FIG. 10 shows where the road markings are as determined by the processor according to one embodiment.

After that the dynamic filter matches connected components from the current and previous frames (FIGS. 7 and 8). The numbers in FIGS. 7 and 8 are in the form n; [x, y]; p=x. The value n is how long the component is tracked in frames. In this example, n is fifteen. The value [x, y] is the average motion vector by frame. In this case [x, y]=[0, 2]+[−1, 4]+[−2, 3]=[−3, 9]. Also p=x means the probability that components are matched correctly. The dynamic filter uses information from previous frames and builds moving trajectories for components (FIG. 9). In this stage it can join several components and propagate some of them from the previous frame. It returns only blobs ($B_{Li}$, $B_{Rj}$) which look and behave like road marking (FIG. 10): ($B_{L1}$, $B_{L2}$, ..., $B_{Ln}$, $B_{R1}$, $B_{R2}$, ..., $B_{Rp}$)=DynamicFilter($C_{L1}$, ..., $C_{Lk}$, $C_{R1}$, ..., $C_{Rm}$). The lines E in FIG. 10 are estimated traffic lines for the frame subject to subsequent adjustment.

Road marking may be bright spots on road with specific geometry, such as circular reflectors, dashed or solid lines. The first stage static filter is a fast operator of interest. It analyzes each scanline independently to find ridges on the image surface. After that it extracts them as connected components. In the next step, it estimates geometry of components to remove obvious clutter. For example, if a component is less than some predefined number of pixels or it has the wrong aspect ratio (width>height) it is classified as clutter/noise. Input data to the static filter includes the IPM grayscale image (I), and left and right regions of interest ($ROI_L$, $ROI_R$).

The filter output includes a list of left and right connected components ($C_{L1}$, $C_{L2}$, ..., $C_{Lk}$, $C_{R1}$, $C_{R2}$, ..., $C_{Rm}$) which correspond to the filtered image. At the beginning, the filtered image (F) is initialized to zero. For each pixel in a scanline from a region of interest ($ROI_L$, $ROI_R$), left and right mean values ($mean_L$, $mean_R$) are calculated. If the pixel value is more than both mean values it is extracted and its position and value is stored in the filtered image (F). The corresponding max($mean_L$, $mean_R$) value is stored into the auxiliary image of mean values (M). Also a one dimensional histogram of mean deviations (H) is updated to represent how many times the (I(x, y)−mean) value was met, as indicated in the following pseudocode:

F={0}
foreach ROI in ($ROI_L$, $ROI_R$):
  M={0}
  H[HIST_SIZE]={0}
  for y=ROI.y till ROI.y+ROI.height:
  for x=ROI.getX(y) till ROI.getX(y)+ROI.width:
  $mean_L$=calculateLeftMean(I, x, y)
  $mean_R$=calculateRightMean(I, y, y)
  mean=max($mean_L$, $mean_R$)
  if I(x, y)>mean:
    F(x, y)=I(x, y)
    M(x, y)=mean
    H[min(I(x, y)−mean, HIST_SIZE−1)]+=1

To calculate a threshold, integrate the histogram of mean deviations so H[i]=H[0]+H[1]+ ... +H[i−1]. After that the integral is analyzed to find a suitable threshold value.

Figure 11:
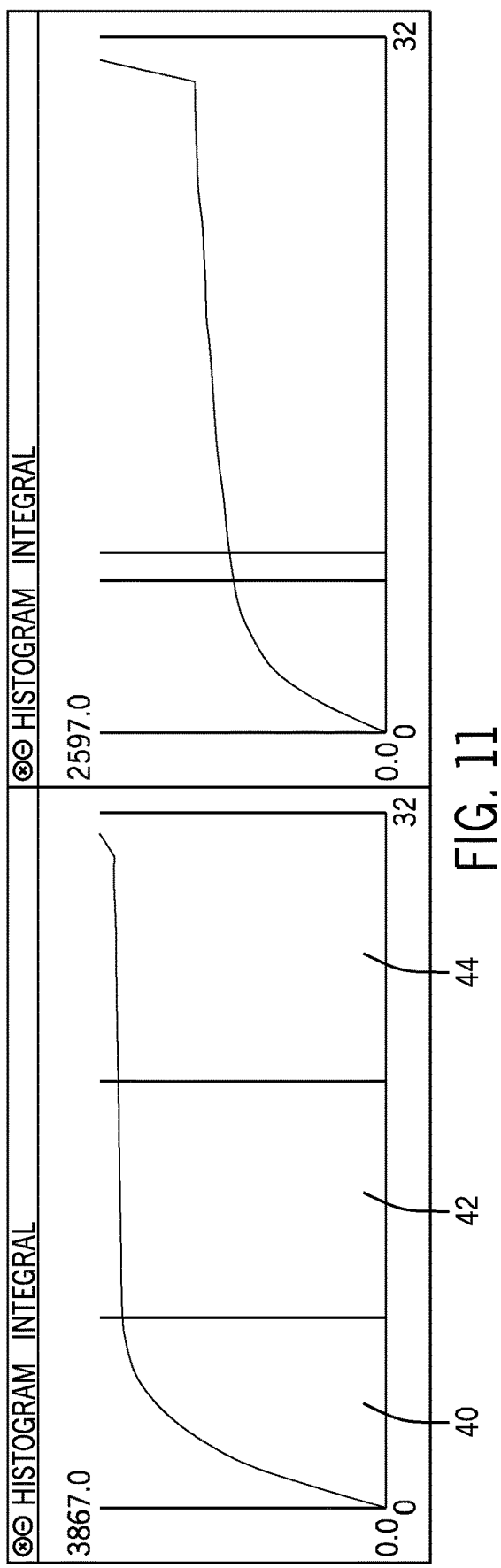
FIG. 11 shows two representative integral of mean deviations histograms according to one embodiment.

FIG. 11 shows the examples of possible integral plots. The left plot is for the dashed traffic lines and the right plot is for the solid traffic line from FIG. 10. The x-axis is a threshold (from 0-32), where the mean corresponds to zero. The mean for each pixel is calculated independently in a neighborhood of the pixel. Thus, the threshold shows how much a pixel is brighter relative (to the pixels in its neighborhood). The y-axis is the number of pixels with intensity/brightness less than a threshold.

It is possible to split each plot into 3 parts. The part 40 has only noisy pixels. The part 42 is nearly flat. Usually it exists and corresponds to gap between noise and road marking. The beginning of the flat region is a good candidate for the threshold value. The part 44 corresponds to bright pixels on the road. If the flat part is absent it is also possible to choose the threshold value as a fixed part of the integral area. One implementation may choose 25% of the integral area as the spare threshold value. The value may be big enough to filter noisy pixels.

threshold=calculateMeanThreshold(H)

Set to zero all pixels on the filtered image (F) for which mean deviations are less or equal to the threshold value. At the end the filtered image should look like on FIG. 5.

for y=ROI.y till ROI.y+ROI.height:
  for x=ROI.getX(y) till ROI.getX(y)+ROI.width:
  if F(x, y)>0 and F(x, y)−M(x, y)<=threshold:
    F(x, y)=0

Extract connected components from the filtered image (F). Any fast algorithm for labeling connected components can be used here including the one described by L. D. Stefan and A. Bulgarelli, "A Simple and efficient connected components labelling algorithm," Proceedings of International Conference on Image Analysis and Processing, 1999, pp. 322-27.

Use geometric restrictions to remove clutter:
($C_{L1}$, $C_{L2}$, ..., $C_{Lt}$, $C_{R1}$, $C_{R2}$, ..., $C_{Rv}$)=extractConnectedComponents (F, $ROI_L$, $ROI_R$)

1. Remove components with wrong aspect ratio (width>height)
2. Remove too small components which cannot be circular reflectors
3. Remove small components if long and thin component is found or you know that solid line should be on the current frame ($C_{L1}$, $CL_2$, ..., $C_{Lk}$, $C_{R1}$, $C_{R2}$, ..., $C_{Rm}$)=filterByGeometry ($C_{L1}$, $C_{L2}$, ..., $C_{Lt}$, $C_{R1}$, $C_{R2}$, ..., $C_{Rv}$)

Road marking is painted objects on a road plane. Relative motion between such objects and a vehicle is predictable and can be tracked. The property can be used to filter glare on a windshield, and/or responses from different obstacles on the road scene (vehicles, poles, pedestrians) which the previous stage is not able to filter. Also a group of blobs that have similar shapes and moving behavior can be combined together.

Input data to a second stage dynamic filter includes a list of connected components: ($C_{L1}$, $C_{L2}$, ..., $C_{Lk}$, $C_{R1}$, $C_{R2}$, ..., $C_{Rm}$).

The output from the second stage dynamic filter includes a list of left and right blobs that look and behave like road marking: ($B_{L1}$, $B_{L2}$ ..., $B_{Ln}$, $B_{R1}$, $B_{R2}$, ..., $B_{Rp}$).

Assume that in a previous frame ($C'_{L1}$, $C_{L2}$, ..., $C'_{Lk'}$, $C'_{R1}$, $C'_{R2}$, $C'_{Rm'}$) components were detected. Also each component on the frame has an associated trajectory $T(C'_{Li})=(T_{Li1}, T_{Li2}, ..., T_{Liq})$, where $T_{Lij}$ is a displacement of a center mass of $C'_{Li}$ component in moment j. The correspondence between components in previous and current frames is found and $T(C_{Li})$ and $T(C_{Rj})$ are built. Thus, components are tracked with some assumptions including the assumption that (1) road marking is a rigid flat, painted object on a road surface, (2) the appearance of these objects do not suffer from a perspective effect because all components are extracted from IPM image.

Without loss of generality one can think of this motion model as a simple translation. While this is not absolutely true, it works well practically and is fast when the speed of vehicles is limited. Thus it is possible to calculate the maximal displacement a priori. If the vehicle speed is known it can improve quality and performance of tracking.

To solve the task, each component from previous frame is compared with each component from current frame. The motion or translation vector is a disparity in centers of mass between these two components.

foreach prevComponent in ($C'_{L1}$, $C'_{L2}$, . . . , $C'_{Lk}$, $C'_{R1}$, $C'_{R2}$, . . . , $C'_{Rm}$):
    prevCenterMass=getCenterMass(prevComponent)
    bestScore=0
    foreach currComponent in ($C_{L1}$, $C_{L2}$, . . . , $C_{Lk}$, $C_{R1}$, $C_{R2}$, . . . , $C_{Rm}$):
        currCenterMass=getCenterMass(currComponent)
        motion=currCenterMass−prevCenterMass To correlate previous and current components, similarity of two components is estimated and unexpected motion is defined. To calculate a similarity feature, all points of previous component are translated on "motion" vector. Assuming that a component is a set of points, then similarity is the intersection of two components divided by union of these components. A logistic function ($p=1/(1+\exp(-c_0*x_0-c_1*x_1-c_2*x_2-c_3*x_3-c_4*x_4))$) may be used with the following features: $x_0=1$, $x_1$=similarity, $x_2$=motion.$x^2$ (penalty for shift by x), $x_3$=motion.$y^2$ (penalty for shift by y), $x_4$=motion.y (penalty for shift by y in wrong way) on coefficients ($c_i$, i=0 . . . 4) before each feature are chosen using these assumptions: if similarity is 0.5 and motion is (0, 0) then p is 0.5, if similarity is 1 and motion is (Image width/16, 0) then p is 0.5; if similarity is 1 and motion is (0, Image height/4) then p is 0.5; if similarity is 1 and motion is (0, −Image height/8) then p is 0.5, and if similarity is 0.4 and motion is (0, Image height/8) then p is 1/(1+e)
    p=correlate(prevComponent, currComponent, motion)
    if bestScore<p:
        bestMotion=motion
        bestMatch=currComponent
        bestScore=p
    if bestScore>0.5 and matching[currComponent].score<best Score:
        matching[currComponent].match=prevComponent
        matching[currComponent].score=bestScore
        matching[currComponent].motion=bestMotion Using information about correspondence between components in previous and current frames one can calculate trajectories for all components in the current frame:
$T(C_{Li})=\{T(C'_{Lk}),$ matching$[C_{Li}]$.motion$\}$, if $C_{Li}<->C'_{Lk}$ ($C'_{Lk}$=matching$[C_{Li}]$.match)
$T(C_{Li})=\{$getCenterMass$(C_{Li})\}$, if $C_{Li}$ does not correspond to a component on previous frame
motion=calculateMotionVector($T(c_{Li})$).

To filter clutter using the dynamic information the following steps may be done:
1. the height of motion vector is more than H; possible value is ⅛ of image height;
2. angle of motion vector is in ($\alpha_{min}$, $\alpha_{max}$) range; possible values are $\alpha_{in}=-120$, $\alpha_{max}=-60$ in Cartesian coordinate system;
3. size of the track is be more than N (the component should be found at least on N consecutive frames); possible value is 3.

Figure 12:
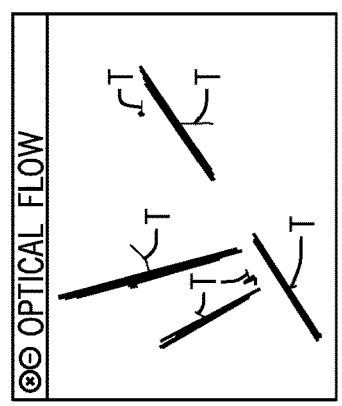
FIG. 12 shows blobs on the road with unexpected trajectories not consistent with road markings according to one embodiment.

This procedure allows the removal of much of the remaining clutter. It is especially useful to understand a scene without road marking where there are blobs that look like road marking but do not behave so (FIG. 12). The marks T in FIG. 12 are tracks for corresponding connected components, showing how the component moves over several frames. These are all unexpected tracks in this depiction.

This procedure does not allow tracking solid lines because in most cases it is not possible to understand movement of a solid line. However, solid lines have enough geometric information to distinguish them from clutter.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

Figure 13:
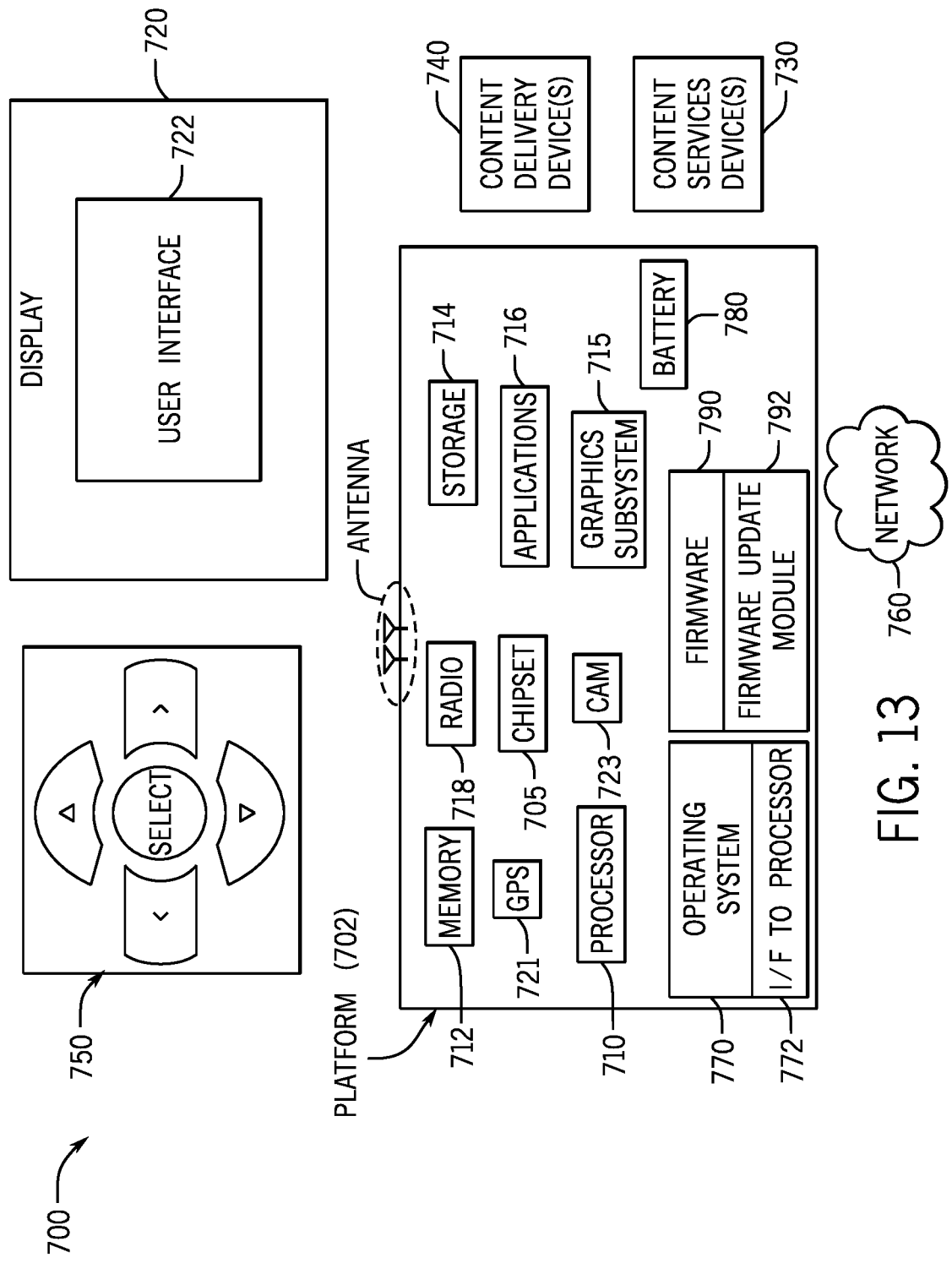
FIG. 13 is a system depiction for one embodiment.

FIG. 13 illustrates an embodiment of a system 700. In embodiments, system 700 may be a transmitter although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 3 and 4 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
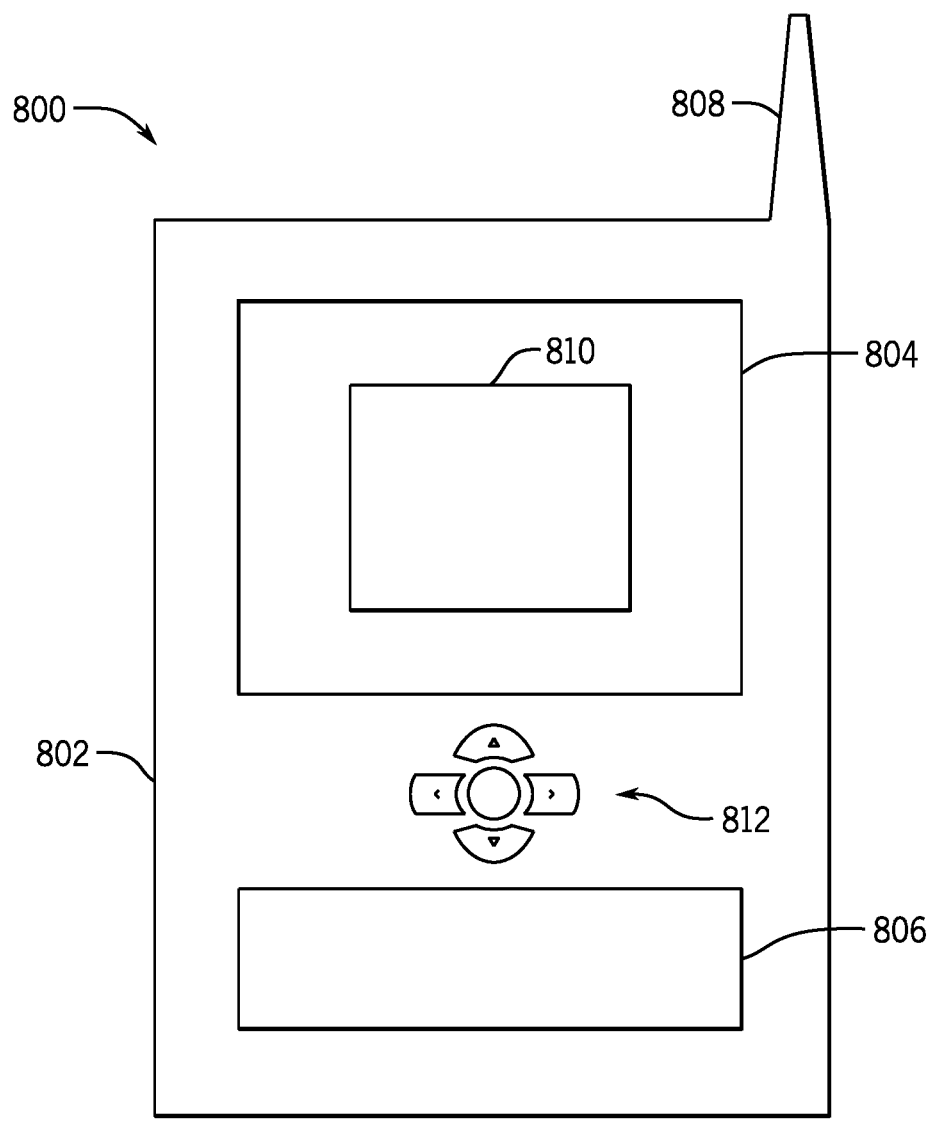
FIG. 14 is front elevation of a system according to one embodiment.

As described above, system 700 may be embodied in varying physical styles or form factors. FIG. 14 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As shown in FIG. 14, device 800 may comprise a housing 802, a display 804 and 810, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

The following clauses and/or examples pertain to further embodiments:

One example embodiment may be a method comprising applying a static filter to locate bright pixels by extracting connected components of bright pixels, and applying geometric restrictions to remove connected components that do not look like road marking, applying a dynamic filter by matching the connected components of pixels from a previous input image and a current input image building a trajectory for the components in the current input image, and removing components with trajectories that are not substantially along the direction a vehicle is moving. The method may also include wherein applying geometric restrictions includes applying restrictions that define known geometric characteristics of lane markings. The method may also include wherein applying restrictions includes applying one or more restrictions based on a number of pixels and shape of lane markings. The method may also include wherein applying restrictions includes analyzing at least one of the length or thickness of a candidate lane marking. The method may also include wherein extracting bright pixels includes dynamically determining a threshold to distinguish bright pixels. The method may also include wherein the step of applying a static filter comprises applying the symmetrical local filter with zero threshold, analyzing all found bright pixels to find an improved threshold, and removing all bright pixels that are below the improved threshold. The method may also include grouping pixels in a histogram based on brightness to distinguish bright pixels. The method may also include removing trajectories based on a known speed of travel of a vehicle. The method may also include removing trajectories based on shape. The method may also include transforming an image taken by a camera facing in a direction of vehicle motion to a bird's eye depiction.

In another example embodiment may one or more transitory computer readable media storing instructions to perform a sequence comprising applying a static filter to locate bright pixels by extracting connected components of bright pixels, and applying geometric restrictions to remove connected components that do not look like road marking applying a dynamic filter by matching the connected components of pixels from a previous input image and a current input image, building a trajectory for the components in the current input image, and removing components with trajectories that are not substantially along the direction a vehicle is moving. The media may further store instructions to perform a sequence wherein applying geometric restrictions includes applying restrictions that define known geometric characteristics of lane markings. The media may further store instructions to perform a sequence wherein applying restrictions includes applying one or more restrictions based on a number of pixels and shape of lane markings. The media may further store instructions to perform a sequence wherein applying restrictions includes analyzing at least one of the length or thickness of a candidate lane marking. The media may further store instructions to perform a sequence wherein extracting bright pixels includes dynamically determining a threshold to distinguish bright pixels. The media may further store instructions to perform a sequence wherein the step of applying a static filter comprises applying the symmetrical local filter with zero threshold, analyzing all found bright pixels to find an improved threshold, and removing all bright pixels that are below the improved threshold. The media may further store instructions to perform a sequence including grouping pixels in a histogram based on brightness to distinguish bright pixels. The media may further store instructions to perform a sequence including removing trajectories based on a known speed of travel of a vehicle. The media may further store instructions to perform a sequence including removing trajectories based on shape. The media may further store instructions to perform a sequence including transforming an image taken by a camera facing in a direction of vehicle motion to a bird's eye depiction.

Another example embodiment may be an apparatus comprising a processor to apply a static filter to locate bright pixels by extracting connected components of bright pixels, apply geometric restrictions to remove connected components that do not look like road marking, apply a dynamic filter by matching the connected components of pixels from a previous input image and a current input image, build a trajectory for the components in the current input image, and remove components with trajectories that are not substantially along the direction a vehicle is moving and a memory coupled to said processor. The apparatus may include wherein said processor to apply restrictions that define known geometric characteristics of lane markings. The apparatus may include wherein said processor to apply one or more restrictions based on a number of pixels and shape of lane markings. The apparatus may include wherein said processor to analyze at least one of the length or thickness of a candidate lane marking. The apparatus may include wherein said processor to dynamically determine a threshold to distinguish bright pixels. The apparatus may include said processor to apply the symmetrical local filter with zero threshold, analyze all found bright pixels to find an improved threshold, and remove all bright pixels that are below the improved threshold. The apparatus may include said processor to group pixels in a histogram based on brightness to distinguish bright pixels. The apparatus may include said processor to remove trajectories based on a known speed of travel of a vehicle. The apparatus may include said processor to remove trajectories based on shape. The apparatus may include said processor to transform an image taken by a camera facing in a direction of vehicle motion to a bird's eye depiction References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
    applying a static filter to a current input image by:
        extracting connected components of bright pixels in the current input image, wherein extracting the connected components of bright pixels includes dynamically determining a threshold to distinguish bright pixels;
        applying geometric restrictions to remove connected components that do not look like road marking; and
        after applying the geometric restrictions, outputting static filtered connected components in the current input image; and
    applying a dynamic filter by:
        matching the static filtered connected components in the current input image to connected components of bright pixels from a previous input image;
        building a trajectory for each of the static filtered connected components in the current input image based on the matching; and
        removing any static filtered connected components with trajectories that are not substantially along a direction in which a vehicle is moving,
    wherein applying the static filter comprises:
        applying a symmetrical local filter with zero threshold;
        analyzing all found bright pixels to find an improved threshold; and
        removing all bright pixels that are below the improved threshold.

2. The method of claim 1 wherein applying geometric restrictions includes applying restrictions that define known geometric characteristics of lane markings.

3. The method of claim 2 wherein applying restrictions includes applying one or more restrictions based on a number of pixels and shape of lane markings.

4. The method of claim 3 wherein applying restrictions includes analyzing at least one of a length or thickness of a candidate lane marking.

5. The method of claim 1 including grouping pixels in a histogram based on brightness to distinguish bright pixels.

6. The method of claim 1 including removing trajectories based on a known speed of travel of a vehicle.

7. The method of claim 6 including removing trajectories based on shape.

8. The method of claim 1 including transforming an image taken by a camera facing in a direction of vehicle motion to a bird's eye depiction.

9. One or more non-transitory computer readable media storing instructions to perform a sequence comprising:
    applying a static filter to a current input image by:
        extracting connected components of bright pixels in the current input image wherein extracting the connected components of bright pixels includes dynamically determining a threshold to distinguish bright pixels;
        applying geometric restrictions to remove connected components that do not look like road marking; and
        after applying the geometric restrictions, outputting static filtered connected components in the current input image; and
    applying a dynamic filter by:
        matching the static filtered connected components in the current input image to connected components of pixels from a previous input image;
        building a trajectory for each of the static filtered connected components in the current input image based on the matching; and
        removing any static filtered connected components with trajectories that are not substantially along a direction in which a vehicle is moving,
    wherein applying the static filter comprises:
        applying a symmetrical local filter with zero threshold;
        analyzing all found bright pixels to find an improved threshold; and
        removing all bright pixels that are below the improved threshold.

10. The media of claim 9, further storing instructions to perform a sequence wherein applying geometric restrictions includes applying restrictions that define known geometric characteristics of lane markings.

11. The media of claim 10, further storing instructions to perform a sequence wherein applying restrictions includes applying one or more restrictions based on a number of pixels and shape of lane markings.

12. The media of claim 11, further storing instructions to perform a sequence wherein applying restrictions includes analyzing at least one of a length or thickness of a candidate lane marking.

13. The media of claim 9, further storing instructions to perform a sequence including grouping pixels in a histogram based on brightness to distinguish bright pixels.

14. The media of claim 9, further storing instructions to perform a sequence including removing trajectories based on a known speed of travel of a vehicle.

15. The media of claim 14, further storing instructions to perform a sequence including removing trajectories based on shape.

16. The media of claim 9, further storing instructions to perform a sequence including transforming an image taken by a camera facing in a direction of vehicle motion to a bird's eye depiction.

17. An apparatus comprising:
a processor to:
apply a static filter to a current input image by:
extracting connected components of bright pixels, wherein extracting the connected components of bright pixels includes dynamically determining a threshold to distinguish bright pixels,
applying geometric restrictions to remove connected components that do not look like road marking, and
after applying the geometric restrictions, outputting static filtered connected components in the current input image; and
apply a dynamic filter by:
matching the static filtered connected components in the current input image to connected components of bright pixels from a previous input image,
building a trajectory for each of the static filtered connected components in the current input image based on the matching, and
removing any static filtered connected components with trajectories that are not substantially along a direction in which a vehicle is moving,
wherein applying the static filter comprises applying a symmetrical local filter with zero threshold, analyzing all found bright pixels to find an improved threshold, and removing all bright pixels that are below the improved threshold; and
a memory coupled to said processor.

18. The apparatus of claim 17 wherein said processor to apply restrictions that define known geometric characteristics of lane markings.

19. The apparatus of claim 18 wherein said processor to apply one or more restrictions based on a number of pixels and shape of lane markings.

20. The apparatus of claim 19 wherein said processor to analyze at least one of a length or thickness of a candidate lane marking.

21. The apparatus of claim 17, said processor to group pixels in a histogram based on brightness to distinguish bright pixels.

22. The apparatus of claim 17, said processor to remove trajectories based on a known speed of travel of a vehicle.

23. The apparatus of claim 22, said processor to remove trajectories based on shape.

24. The apparatus of claim 17, said processor to transform an image taken by a camera facing in a direction of vehicle motion to a bird's eye depiction.

* * * * *